Dec. 12, 1933.    R. A. GEISELMAN    1,939,443
REGULATOR SYSTEM
Filed May 26, 1931    3 Sheets-Sheet 1

WITNESSES:
Leon J. Taga
Carlton F. Bryant

INVENTOR
Ralph A. Geiselman.
BY
Wesley G. Carr
ATTORNEY

Dec. 12, 1933.  R. A. GEISELMAN  1,939,443
REGULATOR SYSTEM
Filed May 26, 1931   3 Sheets-Sheet 2

WITNESSES:
Leon J. Jaza
Carlton F. Bryant

INVENTOR
Ralph A. Geiselman.
BY
Wesley S. Carr
ATTORNEY

Dec. 12, 1933.  R. A. GEISELMAN  1,939,443
REGULATOR SYSTEM
Filed May 26, 1931   3 Sheets-Sheet 3
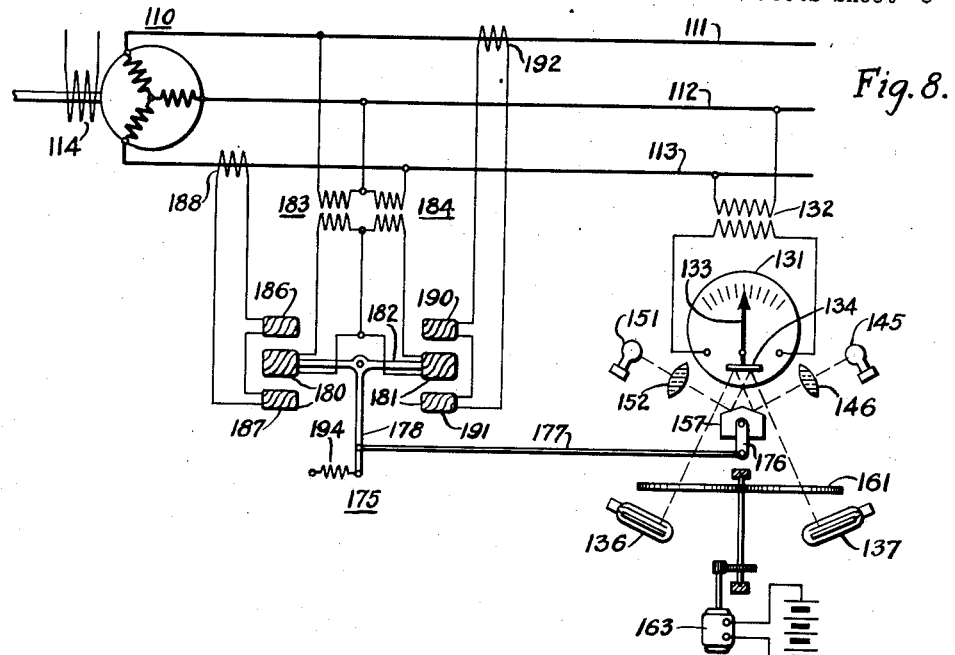
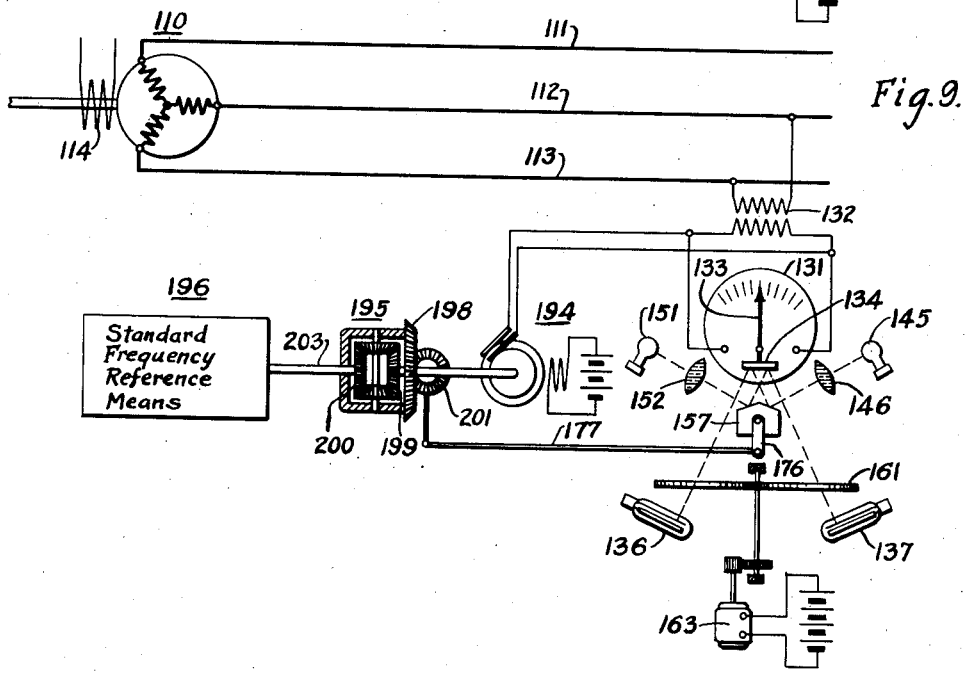
WITNESSES:
INVENTOR
Ralph A. Geiselman
BY
ATTORNEY Patented Dec. 12, 1933

1,939,443

UNITED STATES PATENT OFFICE 1,939,443

REGULATOR SYSTEM

Ralph A. Geiselman, Wilkinsburg, Pa., assignor to Westinghouse Electric & Manufacturing Company, a corporation of Pennsylvania Application May 26, 1931. Serial No. 540,151

13 Claims. (Cl. 250—41.5)

My invention relates to regulators and has particular relation to regulating systems utilizing photo-sensitive devices in the control circuits of quantity-adjusting means, which devices are excited by a light beam the position of which is determined by the value of the quantity regulated.

In all prior regulating systems of this general type, with which I am familiar, the magnitude of deviation from a desired value of the quantity regulated in no way controls or varies, except as regards position, the character of the light beam which is caused to fall upon the photo-sensitive device. There is, therefore, a natural tendency for the regulator to hunt, since small-quantity variations produce the same continuous effect upon the photo-responsive device in the quantity-adjusting control circuit as do larger variations and, consequently, over-shooting of the corrective action tends to take place.

Likewise, the methods for compensating regulators of the photo-sensitive type have, in the past, proved inadequate or unsatisfactory because of their complication, complexity or inherent performance limitations.

It is, accordingly, an object of my invention to provide a regulator of the photo-sensitive-control type in which the character or continuity of the exciting light beam is made to depend upon the magnitude of the regulated quantity error to be corrected.

Another object of my invention is to provide a photo-sensitive controlled regulator which has no inherent tendency to hunt.

A further object of my invention is to provide a regulator of the type described in which recalibration or compensation in accordance with some predetermined condition is readily attainable.

An additional object of my invention is to provide a regulator of the type described in which the magnitude of the corrective effort impulses may readily be adjusted.

More specifically stated, it is the object of my invention to provide a photo-sensitive control type of regulator in which the intensity or magnitude of the corrective action is proportional to the error to be corrected in the regulated quantity, and with which compensating and corrective impulse adjusting means may readily be combined.

In practicing my invention, I attain these and other objects by providing a quantity-measuring instrument, on the movable element of which is mounted a mirror disposed to reflect a light beam, from a source of light, upon a photo-electric cell when the instrument indicates that the regulated quantity has departed from a predetermined value. The photo-electric cell is disposed in the control circuit of quantity-adjusting means in such manner that the excitation produced by the impinging light beam causes the circuits to be energized, and initiates a corrective action. Between the instrument mirror and the photo cell, I dispose screening means which function to allow the beam of light to reach the cell only during regularly spaced periods of time. These screening means are further disposed to cause these time periods to be extremely short when the error in the regulated quantity is small, and to become increasingly longer as the magnitude of this error increases.

I have discovered that a regulator combination of the type just outlined is particularly effective in eliminating the tendency of the regulator to overshoot in its corrective action, since the duration of time in which each of the regularly spaced "step-by-step" quantity corrections can proceed is directly dependent upon the amount of change necessary to bring the regulated quantity back to the desired value.

In combination with the above stated arrangement I provide means, to permit of a recalibration of the optical system, which are so disposed that the regulator may be readily recalibrated manually or compensated automatically in accordance with any one of a number of predetermined conditions which the particular application may make desirable.

My invention itself, together with additional objects and advantages, will best be understood through a description of specific embodiments thereof, when taken in conjunction with the accompanying drawings, in which Figure 1 is a diagrammatic view showing apparatus and circuits illustrating one embodiment of my invention applied to a photo-sensitive-control voltage-regulating system for a direct-current generator.

Fig. 8 is a diagrammatic view of apparatus and circuits showing load-compensating means applied to the frequency-regulating system illustrated in Fig. 5.

Fig. 9 illustrates another method of compensation applied to the regulating system of Fig. 5 for the purpose of matching the regulated frequency with that of a standard reference means.

Figure 1:
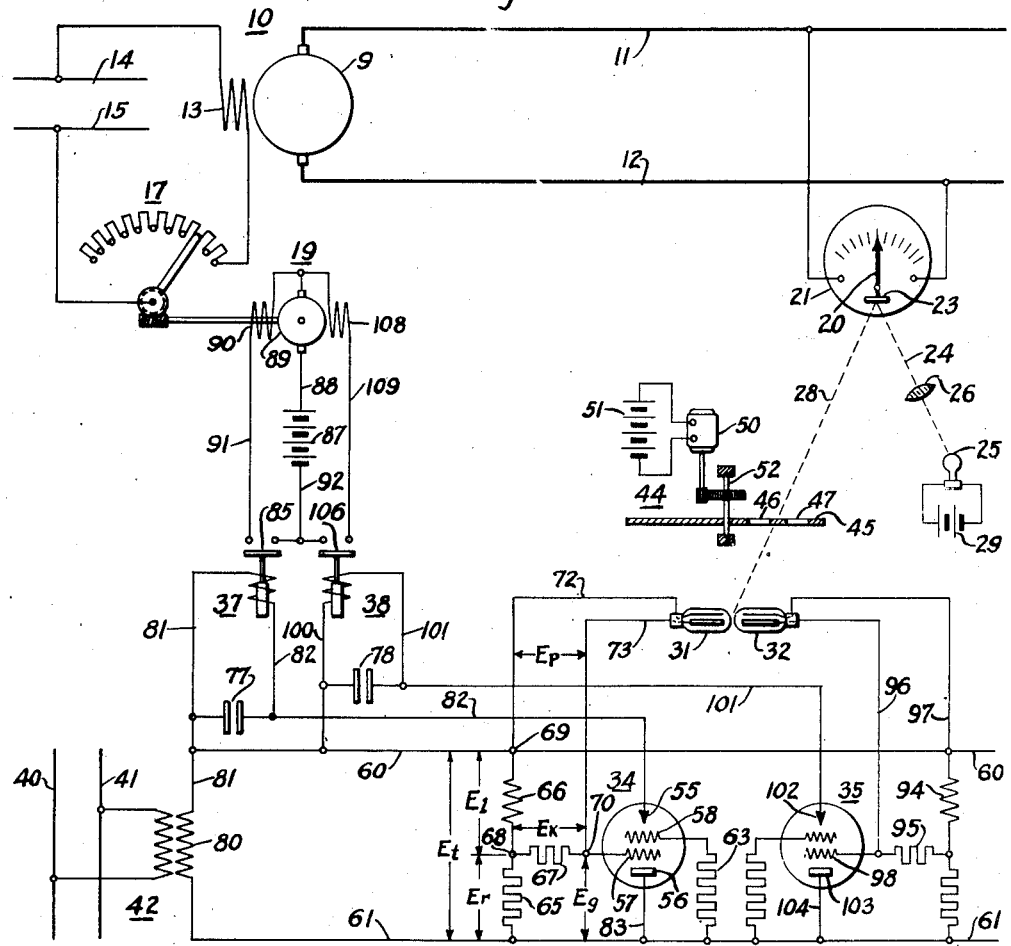

Referring to the drawings, particularly Fig. 1 thereof, a direct current generator 10 comprising an armature 9 and a field-winding 13, supplies voltage to circuit conductors 11 and 12. Field winding 13 may be excited from any suitable direct-current source, such as circuit conductors 14 and 15. The control of the voltage of generator 10 is effected in a well known manner by changing the setting of a rheostat 17 disposed in the field-winding circuit.

For the purpose of maintaining the voltage between circuit conductors 11 and 12 at a constant or predetermined value, the regulating system of my invention is disposed in the manner shown to control the energization of a rheostat-operating motor 19 in accordance with changes from a given value of the generator voltage.

A measuring instrument 21, which, in this case, is a voltmeter, is connected to circuit conductors 11 and 12, and carries, upon the indicating element or pointer 20, a mirror 23 upon which a beam of light 24, supplied from a lamp 25 through a suitable focusing lens 26, impinges in a manner that it is reflected along a path indicated by dotted line 28. The direction of the reflected beam shown corresponds to the position of instrument element 20 when the regulated voltage is of the desired value. Lamp 25 is stationarily mounted and may be energized from any suitable source, such as battery 29.

Movement of mirror 23, caused by a change in the voltage between circuit conductors 11 and 12, shifts the direction of the reflected light beam either to the left or to the right of that indicated at 28, causing the beam to be directed through the one or the other of the openings 46 or 47 in the disc 45 upon the photo-electric cell 31 or upon the photo-electric cell 32, located in some manner such as indicated.

The photo-electric cell 31 is disposed in the control-grid circuit of a grid-glow tube 34, and cell 32 is similarly disposed to act upon a second grid-glow tube 35.

Grid-glow tubes 34 and 35 respectively act to energize motor-control relays 37 and 38 which are disposed in the energizing circuit of the rheostat-operating motor 19 in the manner shown.

As will be more completely explained later, the excitation of photo-cell 31, which occurs when the light beam moves to the left of the mid position shown in response to a rise in the generator voltage, causes grid-glow tube 34 to pass a current which actuates relay 37 and energizes the motor 19 to operate the field rheostat 17 in the voltage-lowering direction, and, similarly, an excitation of the photo-electric cell 32 by the reflected light beam, which occurs only when the generator voltage falls, causes the grid-glow tube 35 to pass a current to actuate the motor control relay 38 and operate the rheostat-adjusting motor 19 in the voltage-raising direction. It will be observed that, as illustrated in Fig. 1, the grid-glow tubes 34 and 35, photo-cells 31 and 32, and the motor-control relays 37 and 38 are energized from alternating-current-circuit conductors 40 and 41 through a transformer 42.

It will be apparent to those skilled in the art that, if the reflected light beam be allowed to continuously fall upon either of the photo-electric cells until such time as the quantity-adjusting means, operating continuously, has completely corrected the regulated quantity, "over-shooting" of the corrective action will result.

To overcome this overshooting tendency, I interpose between the measuring instrument mirror 23 and the photo-sensitive devices, as before mentioned, screening means for permitting the reflected beam to reach these devices only during regularly recurring time intervals, the duration of which is dependent upon the amount of change in position of the light beam from the normal neutral direction. In Fig. 1, such screening means are illustrated generally at 44 and comprise a disc 45 having two openings 46 and 47 on either side of the intermediate path 48, shown in Fig. 3, at which the reflected beam of light strikes this disc when the instrument element 20 occupies the normal or desired position. In operation, the disc 45 is rotated at a relatively slow speed by any suitable means, such as motor 50, mechanically connected to rotate the shaft 52 upon which the disc 45 is mounted and suitably energized, as from the battery 51.

It will be apparent that, since the reflected light beam is thus permitted to reach the photo-cell devices only for a short period during each rotation of screening disc 45, the corrective action initiated by the beam will be of a step-by-step nature, so that corrections in the generator voltage may thus be caused to extend over an appreciable period of time and take place in a plurality of increments. Furthermore, by shaping the screening-disc openings 46 and 47 in the manner shown in Fig. 3, or their equivalent, the size of these increments is made to vary in accordance with the difference between the actual generator voltage and the desired value. It will be appreciated that such manner of operation produces a regulatory action which is inherently stable and from which a tendency to "over-shoot" is completely removed.

Figure 3:
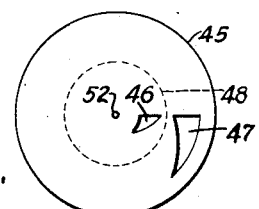
Fig. 3 is a plan view of a fixed-opening screening-disc element utilized by the regulating system of Fig. 1.

Referring to Fig. 3, it will be seen that, as the reflected light beam is swung in either direction away from the path 48, it will pass through one of the openings 46 or 47 for a period of time, during each rotation of disc 45, which will depend upon the distance away from radius 48 that it strikes the disc. It will also be evident that the same result may be obtained by using other forms of openings which are so shaped that they include progressively greater angular distances as the radial distance from a given neutral light-position radius increases. Likewise, forms of screening means other than the rotating disc, which accomplish the same result, may also be utilized in the system of my invention.

The grid-glow-tube control circuits illustrated in the system of Fig. 1 comprise one modification of the fundamental and basic system covered by copending application Serial No. 524,872, by Lawrence R. Quarles, filed March 24, 1931 and assigned to the Westinghouse Electric & Manufacturing Company. In that application, are disclosed relay circuits involving photo-electric cells and grid-glow tubes together with phase-shifting circuit elements which eliminate transition points in the control impulses and possess other advantages more completely pointed out therein.

The grid-glow tube 34, for instance, which is of a well known type, comprising an anode element 55, cathode element 56, a control grid element 57 and a shielding grid element 58, is energized by an alternating-current voltage supplied to conductors 60 and 61 from the transformer 42. Preferably, the magnitude of this voltage is of the general order of 440 volts.

Under certain conditions of potential impressed between the control-grid and cathode elements of a grid-glow tube, current conduction, during the positive half cycle of the alternating-current voltage, will take place from the anode to the cathode element of the tube, while, under other control potential conditions, such current conduction will not occur. In passing, it may be mentioned that the shielding-grid element, designated at 58 in grid-glow tube 34, which is connected to the conductor 61 through a resistor 63, takes no active part in the operation of the tube, it being included therein for the purpose of improving the characteristics and increasing the tube life.

To control the control-grid potential of tube 34 in accordance with the light excitation of photo-cell 31, a network, which comprises a resistor 65 and an inductor 66, is connected in series circuit relation between the energizing conductors 60 and 61, and a second resistor 67, connects the grid element 57 to the point 68 between the resistor 65 and the reactor 66. Between points 69 and 70 of this network, photo-electric cell 31 is connected by means of conductors 72 and 73.

A photocell, as is known, when it is in an unexcited or "dark" condition, responds to a voltage in a manner similar to a capacitor of small magnitude. On the other hand, when it is excited by a beam of light, the photocell simulates a resistor. It is to be noted that, while a capacitor has the character of introducing considerable shift in phase in a voltage impressed across it, a resistor produces no such effect.

The manner in which the photo device functions to modify the voltage impressed on the control-grid element of the grid-glow tube may best be explained by reference to the vector diagram of Fig. 2 in which vector $E_t$ represents the voltage impressed upon series-connected resistor 65 and inductor 66, while $E_r$ and $E_l$, respectively, denote the corresponding voltages across the terminals of each of these devices. Since the total voltage impressed across the inductor and the resistor is equal, in magnitude, to the square-root of the sum of the squares of the individual voltages across these two elements, the last two named vectors, $E_r$ and $E_l$, intersect on a semicircle 75 of which the vector $E_t$, representing the total voltage, is the diameter.

It will be seen that the photo-electric cell 31 is acted upon by an alternating-current potential derived from points 69 and 70 in the control-circuit network of grid-glow tube 34.

When the photocell 31 is in the unexcited condition, the voltage drop across it may be represented by vector $E_p$, while the voltage drop across resistor 67, with which it is connected in series between the two terminals of inductor 66, may be represented by $E_k$.

It will be seen that control-grid element 57 is acted upon by the potential difference between point 70 and conductor 61. Under the unexcited photo-cell conditions, therefore, the grid-control voltage will have the magnitude and phase position given by vector $E_g$, which is such that grid-glow tube 34 does not conduct current between its major elements.

Figure 2:
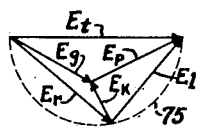
Fig. 2 is a diagram of voltage vectors illustrating the operation of the grid-glow tube relay control circuits which are utilized to actuate the quantity-adjusting means of the system shown in Fig. 1.

Light excitation of the photo-cell causes it to assume characteristics of a resistor, with the result that the vector $E_g$ of Fig. 2 is caused to more nearly coincide with vector $E_t$ and to increase its magnitude. This change is such that the grid-glow tube 34 is caused to pass current between anode and cathode elements 55 and 56.

It will be noted that the photo-cell 32 bears the same relation, with respect to the control network of grid-glow tube 35, as does the cell 31 to the tube 34, and, because of this similarity, a detailed description of the control circuits will not be made.

It will be observed that the current which grid-glow tube 34 conducts from anode to cathode will pass through the actuating winding of the motor-control relay 37 and that, similarly, the current which the grid-glow tube 35 conducts will act to energize the winding of the motor-control relay 38. It will be recognized further that the grid-glow tube currents mentioned are of a pulsating nature. To smooth out these pulsations and make the tube current more effective in energizing the motor-control relays, condensers 77 and 78 are connected in parallel with the respective windings of these relays in the manner shown.

In the operation of the regulating system shown in Fig. 1, a rise in the voltage of the generator 10 above its normal value causes the indicating element 20 of voltmeter 21 to move to the right and shifts the reflected beam of light to the left of neutral position 28. Each time the opening 46 of the rotating disc 45 passes under the reflected beam, the light passes through this opening and falls upon photo-electric cell 31.

Each time the light falls upon the photo-cell 31, the characteristics are so modified that the cell changes from a capacitance device to a resistance device and thus reduces and changes the phase position of the voltage across its terminals, in the manner already explained.

As a result, the grid-glow tube 34 is caused to conduct current during the positive half cycle of the alternating-current voltage impressed upon it through a circuit which extends from one side of the transformer secondary winding 80, through conductor 81, the winding of motor-control relay 37, conductor 82, anode 55 and cathode 56 of grid-glow tube 34, conductor 83 and conductor 61, to the other side of the transformer winding 80.

Thus energized, relay 37 actuates its movable element upwardly, completing through its contact member 85 a motor-energizing circuit which extends from one side of a battery 87, through conductor 88, armature 89 of motor 19, a section 90 of the motor-field winding, conductor 91, contact member 85 of relay 37 and conductor 92 to the battery 87.

Thus, energizing the motor 19 causes it to operate the voltage-adjusting rheostat 17 in the voltage-lowering direction for as long a period during each revolution of screening disc 45 as the reflected light beam is permitted to fall upon photo-cell 31. Corrective action thus takes place in a step-by-step manner.

If the voltage between conductors 11 and 12 initially rises considerably above its desired value, the reflected light beam is shifted a proportionately large distance so that it passes through opening 46 in the screening disc near the inner radius of this opening, and the time thus allowed during each rotation of the disc is relatively large.

As the corrective actions of the motor-operated rheostat come into play, and the generator voltage is brought back nearer the desired value, the reflected light beam is moved progressively back towards the neutral position, and, in so moving, it passes through opening 46 farther and farther away from the inner radius thereof which, it will be seen, shortens the period of time of the corrective action during each rotation of the disc. Thus, when the correction becomes nearly complete, the periods of rheostat adjustment become extremely short and, at the time the adjustment has been entirely made, the light beam has been moved completely out of the range of the opening 46 in the screening disc, and may occupy a position corresponding to the intermediate radius 48.

In the event that the generator voltage drops below the desired value, the indicating element 20 of the voltmeter 21 moves to the left and shifts the reflected beam into the range of the opening 47 in the screening disc, thus causing it to fall upon the photo-electric cell 32 each time the opening of the rotating disc passes under the beam.

Energization of the photo-cell 32 acts upon the grid-glow tube 35 in a manner similar to the action of the photo-responsive device 31 upon the grid-glow tube 34 which has already been explained, to cause the tube 35 to pass current between its major elements. It has been observed that the control circuits for the tube 35 are identical with those of the tube 34.

Thus, each time the light beam falls upon the photo-cell 32 which will be seen to be acted upon by combined voltage drops in inductor 94 and resistor 95, connection being made thereto by means of conductors 96 and 97, the voltage acting upon control-grid element 98 of tube 35 is increased and shifted in phase position to cause current to flow between the anode 102 and cathode 103 of the tube.

This action energizes the motor-control relay 38 through a circuit which extends from one side of transformer winding 80, through conductor 81, conductor 60, conductor 100, the winding of motor-control relay 38, conductor 101, anode element 102 and cathode element 103 of grid-glow tube 35, conductor 104 and conductor 61 to transformer winding 80.

Thus energized, the motor-control relay 38 actuates contact member 106 thereof upwardly, completing an energizing circuit for the rheostat-operating motor 19 which extends from the battery 87, through conductor 88, armature winding 89 and a second section of field winding 108 of motor 19, conductor 109, contact member 106 of relay 38 and conductor 92 to the battery 87.

Thus energized, each time opening 47 allows the reflected light beam to fall upon photo tube 32, motor 19 operates the voltage-adjusting rheostat 17 in the voltage-raising direction. As in the case of the voltage-lowering action, such adjustment takes place in a step-by-step manner.

Assuming that the original error in the generator voltage was such as to shift the reflected beam to a position in which it passes through the opening 47 in the screening disc near the outer radius thereof, the period of time for each disc revolution that it falls upon photo-electric cell 32 is relatively long. As the corrective actions operate to bring the voltage back to the desired value, these time periods become increasingly shorter, thus effectively preventing an over-shooting of the corrective action, as will be evident.

In certain regulator applications, it is desirable that the magnitude of the corrective impulses be changed in accordance with different operating conditions. In the systems of my invention, such a change may readily be effected by modifying the angular dimensions of the screening-disc openings in a manner to vary the time during each rotation of the disc that light is permitted to fall upon the photo-sensitive device.

Figure 4:
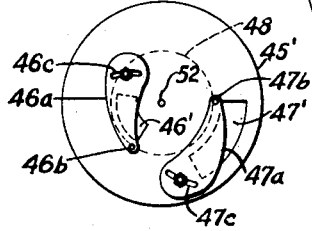
Fig. 4 is a plan view of an adjustable-opening screening-disc element which may be utilized by the regulating system of Fig. 1.

In Fig. 4, I have shown an adjustable-opening type of screening disc which may be used in the system of Fig. 1, in the same manner as is the fixed-opening disc shown in Fig. 3, to accomplish corrective impulse adjustment. This disc 45' is provided with openings 46' and 47' the size of which may be adjusted by shifting the position of movable members 46a and 47a. It will be observed that each of these movable members is pivoted at one end, 46b and 47b, and provided with a slot, 46c and 47c, and releasable clamping means at the other.

It will be apparent that the sensitivity of the regulator may be made extremely high by making the distance between the instrument mirror and screening means and photo-sensitive devices of a large value. Consequently, it will be apparent that my invention embodies a regulating system which inherently possesses a wire range of sensitivity possibilities.

Figure 5:
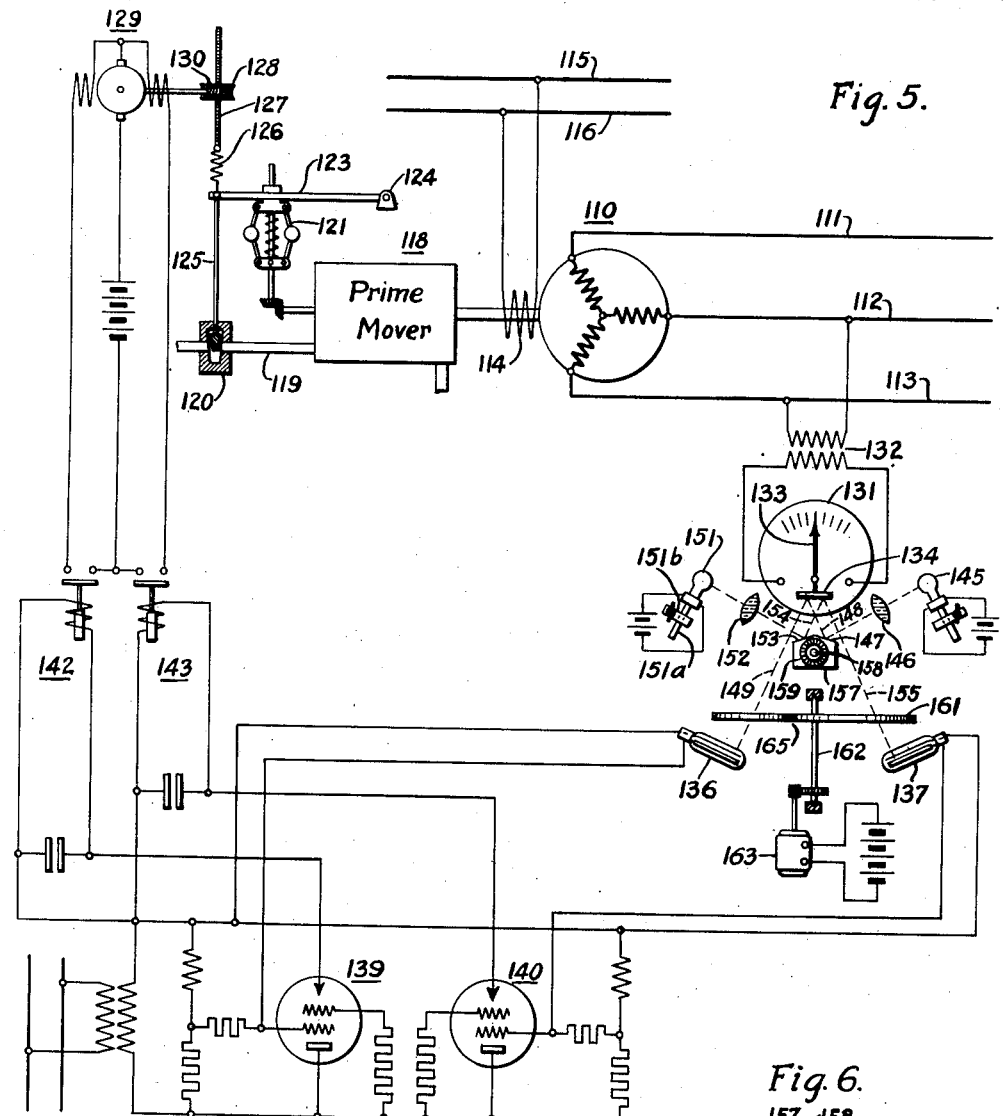
Fig. 5 is a diagrammatic view showing apparatus and circuits illustrating a second embodiment of my invention applied to a photo-sensitive-control frequency regulator for an alternating-current generator.

In Fig. 5, I have illustrated another modification of my invention which is shown as being adapted to regulate the frequency of an alternating-current generator 110 which supplies power voltage to circuit conductors 111, 112 and 113. In addition to the armature windings shown connected to the power-circuit conductors, generator 110 comprises the usual field winding 114, suitably excited from a direct-current source represented by conductors 115 and 116.

The generator is driven by a prime mover 118 which is supplied with motive fluid through a suitable conduit 119 in which is disposed a flow-control valve 120. The speed of prime mover 118 may be controlled in a well known manner by means of a fly-ball governor 121, driven by the prime mover shaft, disposed to control the flow of motive fluid in accordance with the speed of rotation. As illustrated, control movements are transmitted to a mechanical linkage comprising movable lever 123, one end of which is pivoted at 124 and the other end of which communicates the movement to the adjusting mechanism of the fluid-control valve 120, by means of a member 125.

One well known form of frequency-regulating system utilizes calibrating or re-setting means in conjunction with the governing mechanism just explained. As illustrated in Fig. 5, such re-setting means comprises a tension spring 126 attached to movable arm 123, together with a threaded and vertically movable rod member 127 which cooperates with an interiorly threaded gear-wheel 128 disposed to be rotated by a suitable motor 129 which drives a cooperating wormgear 130. Rotation of motor 129 in the one or the other direction increases or decreases the tension of spring 126 to respectively raise or lower the speed at which the governing mechanism will maintain the prime mover and the driven generator 110. The frequency of the generated voltage will be understood to be directly dependent upon the speed of the generator.

The regulating system of my invention, as shown in Fig. 5, is disposed to control the operation of governor-calibrating motor 129 in accordance with deviation in the frequency of generator 110 from a desired value. It comprises a measuring instrument in the form of a frequency meter 131 connected in a well known manner to two of the power-circuit conductors, as 112 and 113, through a suitable transformer 132 or other connecting devices. The movable element 133 of the measuring instrument carries a mirror 134, as in the modification already explained. Likewise, a "raise" and a "lower" photo-electric cell, illustrated, respectively, at 136 and 137, is utilized to control the operation of grid-glow tubes 139 and 140 which, in turn, actuate "raise" and "lower" motor-control relays illustrated at 142 and 143, respectively. These relays control the operation of governor-calibrating motor 129 by means of the circuits shown.

As illustrated, the motor-control circuits are identical with those shown and described in connection with the system of Fig. 1. This identity includes photo-electric cells, grid-glow tubes, motor-control relays and the quantity-adjusting motor 129 itself. In subsequent explanation of the system operation, therefore, no detailed tracing of circuits will be made.

The modification of my invention depicted in Fig. 5 differs from that shown and described in Fig. 1 in respect to the optical system which is utilized. In the system of Fig. 5 it will be observed that two sources of light are utilized, the first source comprising lamp 145 which directs, through lens 146, a ray of light upon a reflecting surface 147, from which it is reflected, along path 148, to mirror 134, and from the mirror along some path, such as 149, upon photo-electric cell 136.

The second source of light comprises a similar lamp 151 which directs a ray of light through lens 152 upon a second reflecting surface 153, from which the light is reflected, along path 154, upon the instrument mirror 134, from which it is reflected along some path, such as 155, upon photo-cell 137.

For purposes to be made evident later, each of the two lamps is provided with position-adjusting means, illustrated in the form of a holding rod 151a, supported by a stationary clamping device 151b, which, when loosened, permits the lamp-holding rod to be slid in the one or the other direction to a different position in which it may be secured by retightening the clamping device.

Reflecting surfaces 147 and 153 preferably are made a part of a common optical member, designated in Fig. 5 by 157, which member, for purposes to be explained, may be provided with adjusting means comprising a mounting shaft 158 and a knob member 159 for turning the shaft.

Screening means are disposed between the reflecting mirror on the measuring instrument and the photo-cells, such means comprising a circular disc 161 mounted on a suitable shaft 162 which is caused to rotate under the action of a motor 163. Instead of having two separate openings, as does the first disclosed modification of my invention, disc 161 may be provided with a single symmetrically shaped opening, or removed portion, indicated, in Fig. 6, at 165.

Figure 6:
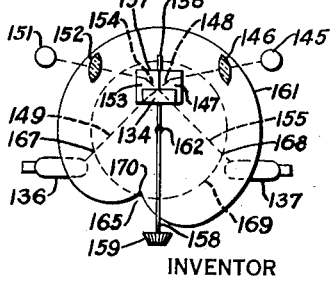
Fig. 6 is a plan view of the optical system and screening means which form parts of the regulating system shown in Fig. 5.

As indicated in Fig. 6, which is a plan view of the optical system utilized by the regulating system of Fig. 5, the light sources 145 and 151 are disposed somewhat back of reflecting member 157 so that the beams of light reflected from this member are cast, in a slightly forward direction, upon the instrument mirror 134 from which, in turn, they are reflected still farther forward to fall upon photo-electric cells 136 and 137 which are disposed underneath screening disc 161 in some such forward position as is shown.

When the regulated quantity, or the frequency in the system of Fig. 5 is of the desired or predetermined value, the reflected light beams 149 and 155 impinge upon the screening disc at points 167 and 168, respectively, which are symmetrically located with respect to the center of the disc so that they lie upon a common radius 169. The size of this radius is such that it just intersects point 170 of opening 165 before-mentioned. Rotation of the disc, therefore, causes this opening to progressively pass by points 167 and 168, and, for the condition shown, may allow the reflected light beams to fall upon the photo-electric cells for very short spaces of time which, in practice, are insufficient to cause the governor-calibrating motor 129, or other quantity-controlling device upon which the regulator may be arranged to act, to operate, so that no adjustment in the regulated quantity is effected for this given condition.

It will be seen that a shift in the position of instrument mirror 134 moves the reflected beams out of the symmetrical relation with respect to the disc center, in such manner that one of them will be allowed to fall upon the corresponding photo-cell, as the disc opening passes beneath it, for a period of time sufficient to effect corrective operation of the quantity-adjusting means, while the other beam of reflected light is completely blocked off from the second photo-tube.

Thus, in the operation of the frequency-regulating system of Fig. 5, a rise above normal in the frequency of generator 110 moves indicating element 133 of frequency meter 131 to the right and effects a corresponding shift in the position of mirror 134. The effect of this shift will be seen to move above reflected beams 149 and 155 to the left, in such manner that beam 149 strikes screening disc 161 nearer its outer radius, while beam 155 strikes the disc nearer the center. As the disc rotates, and opening 165 passes over photo-cell 136, light beam 149 is allowed to fall upon the cell for a period of time, the length of which depends upon the particular position of the beam.

Each period of light-excitation of cell 136 results in the passage of current through grid-glow tube 139 and the energization of "lower" motor-control relay 142 which, in turn, causes motor 129 to so change the tension in governor-calibrating spring 126 that the speed of prime mover 118 will be decreased. These corrective changes take place in a step-by-step manner, and, as the frequency of the generator 110 again approaches the desired value, the duration of each corrective step becomes increasingly less, since it will be apparent that, as the instrument mirror 134 again assumes or approaches the normal or neutral position indicated in the drawings, reflected light beam 149 again moves nearer the center of the disc, so that it is allowed to pass through opening 165 for progressively shorter periods of time.

Similarly, a fall or decrease below the desired value of the generator frequency shifts frequency meter element 133 to the left, and causes reflected light beams 149 and 155 to impinge upon screening disc 161 at points which lie to the right of those indicated in Fig. 6. Since light beam 155 now occupies a position nearer the outer radius of the screening disc 161, it will be permitted to fall upon photo-cell 137 for a period of time during each disc revolution which is sufficient to effect an operation of the governor-calibrating motor 129 in a speed-raising direction. These operations take place in a manner similar to the frequency-lowering operations just explained.

It will be apparent that, in the optical system depicted in Fig. 5, calibration adjustments may be effected by shifting the position of reflecting surfaces 153 and 147 as, for instance, by rotating the reflector element 157 in the one or the other direction. This may be done manually, as already mentioned, by turning knob 159.

It will be apparent that, if reflecting element 157 is rotated, in a counter-clockwise direction, to some new position, it will shift the reflected beams 148 and 154 both to the left upon instrument mirror 134 and will cause reflected beams 149 and 155 to impinge upon screening disc 161 at points which lie to the left of those illustrated in Fig. 6. This will allow frequency-lowering photo tube 136 to be excited which, acting through the control circuits, operates motor 129 to effect a change in calibration of the prime-mover governor in a direction to lower its speed. The speed and frequency of generator 110 will, accordingly, be lowered to a value at which instrument mirror 134 will assume a new position in which the reflected beams 155 and 149 again fall upon the screening disc at symmetrically located points.

Similarly, if reflector element 157 be turned in a clockwise direction to some new position, the reflected beams of light will be moved to the right with respect to screening disc 161, and governor-calibrating means of the prime mover will now be re-adjusted in such manner that the prime mover will be driven at a higher speed which is of such magnitude that the frequency of generator 110 will be increased to the extent that instrument mirror 134 assumes a second new position in which reflected beams 149 and 155 are again brought back to the normal symmetrical relation with respect to the center of screening disc 161.

It will be apparent that other elements in the optical system may also be shifted in position to similarly effect a re-calibration of the regulator. Likewise, the inactive zone, or range of the instrument-indicating-element movement in which neither light beam will fall upon the photo-devices, may be adjusted by shifting the position of the light sources. In the system of Fig. 5, it will be apparent that, if lamps 145 and 151 be moved upwardly in their holders, reflected beams 149 and 155 will be shifted towards the center of the screening disc, and the inactive zone will thereby be increased.

Recalibration of the regulator shown in Fig. 1 may likewise be effected by shifting certain elements in the optical system, as, for instance, shifting the light source 25 either to the left or to the right to correspondingly change the position which meter element 20 must occupy in order to direct the light beam along the path indicated by line 28. Either manual or automatic means may readily be combined to effect such recalibration.

Figure 7:
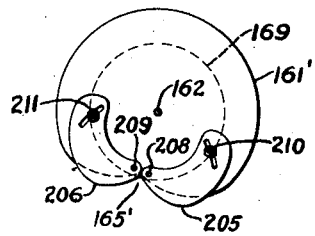
Fig. 7 is a plan view of an adjustable-opening screening disc element which may be utilized by the regulating system of Fig. 5.

By providing, in the system of Figs. 5 and 6, an adjustable-opening-type of screening disc, the magnitude of the corrective impulses may readily be changed to meet different operating requirements. One type of screening disc suitable for this service is illustrated in Fig. 7 at 161'. The size of opening 165' of the disc 161' may be regulated in accordance with the position of adjusting elements 205 and 206, which are respectively pivoted to the disc at 208 and 209 and provided with releasable clamping means 210 and 211, disposed in the manner shown.

It will be evident that the regulating system of my invention, particularly the modification shown in Figs. 5 and 6, readily lends itself to compensation or recalibration by automatic means. One manner in which this may be accomplished is illustrated in Fig. 8 in which the optical system depicted in Fig. 5 is reproduced, together with automatic compensating means shown generally at 175. The manually adjusting knob 159 illustrated in Figs. 5 and 6 is replaced by a lever member 176 to which is connected a member 177 which is pivoted upon a movable arm 178 of the automatic compensating means, in the manner shown. The system of Fig. 8 is a duplicate of that shown in Fig. 5, it being disposed to control the frequency of generator 110. The prime mover, which drives the generator, its governing means, the governor-calibrating motor and control circuits for the operation thereof have been omitted in Fig. 8, since they may be identical with those shown in Fig. 5, which are completely described hereinbefore.

The compensating means 175, known in the art as a Kelvin balance, are responsive to the value of load which generator 110 supplies to power-circuit conductors 111, 112 and 113, the compensating arrangement depicted being suitable for causing the regulator to so control the frequency of generator 110 that its load output will be maintained within predetermined limits. It will be recognized that the fulfilling of such a requirement is frequently desired in frequency-regulating systems.

The Kelvin balance equipment 175 comprises two potential windings 180 and 181 carried on either end of a pivoted bar 182 which is mechanically integral with arm 178 previously mentioned. Windings 180 and 181 are respectively energized from potential transformers 183 and 184 which are connected to the power-circuit conductors in the manner shown. On either side of each of the potential coils is disposed a current winding, the two current windings of each pair being series connected and energized from a current transformer in one of the power-circuit conductors. Thus, as illustrated, current windings 186 and 187 are energized by current transformer 188, associated with conductor 113, while windings 190 and 191 are energized from current transformer 192 associated with conductor 111. It will be seen that the connections with the three-phase power circuit are such that the Kelvin balance gives an indication which is determined by the polyphase watts.

In operation of the balance, arm 178 is biased to the left by means of a tension spring or other equivalent force-producing member 194, against which the magnetic forces between the potential and current-coil assemblies act, these latter forces tending to rotate the pivoted arm 182 in a counter-clockwise direction and move arm 178 to the right. The force intensity will be seen to vary with the amount of power supplied by generator 110 so that, if the power increases, reflecting element 157 will be rotated counter-clockwise to a new position, while, if the power decreases, it will be rotated clockwise to some other new position. This results in a recalibration of the regulating system which has already been explained, and which functions, in this particular combination, to maintain, within predetermined limits, the power output of generator 110.

In Fig. 9, I have shown another method for automatically controlling the position of reflecting element 157 which may be applied to the regulating system of my invention. This compensating method, if combined with the frequency-regulating system shown completely in Fig. 5, is particularly applicable to situations in which it is desired to maintain the frequency of the generator regulated in accordance with some standard reference means in order that the generated power voltage may be suitable for accurately driving electric clocks and other similar timing devices.

In Fig. 9 is illustrated a synchronous motor 194 energized by the voltage of generator 110 the frequency of which is to be matched with a standard. Motor 194 is connected to a differential mechanism 195 by means of which its speed is compared with that of a standard-frequency reference means 196. When the frequency of generator 110 is at the desired value, there will be no movement in the differential-housing gear wheel 198 since, for such condition, gear wheel 199, attached to the shaft of synchronous motor 194, will be driven at the same speed as, and in the opposite direction to, gear wheel 200, rotated by reference means 196 which drives shaft 203.

In the event that a difference in frequency between the reference means and the regulated generator 110 results, this difference will cause synchronous motor 194 to drive gear wheel 199 at a speed which correspondingly differs from that of gear wheel 200. This results in a movement of differential-housing gear wheel 198, which movement is transmitted to cooperating gear-wheel 201 which, in its rotation, shifts the position of regulator-reflector element 157 in such direction as to bring the regulated frequency back to the value which matches that of the standard reference means.

It will be apparent that such compensating system as is illustrated in Figs. 8 or 9 effects a continuous recalibrating process. Should it be desired, however, a step-by-step corrective means might be utilized to accomplish the same result, in which case, the reflector element 157 would be rotated in steps according to the accumulated error.

It will further be apparent that compensating means of this general type may be applied to the regulator of my invention when used for controlling quantities other than frequency or voltage.

The regulating system of my invention may, as will be evident, be adapted to any control scheme that is not a purely on-and-off problem; thus, it can be used to control any measurable electrical quantity mechanical movement by pressure, temperature variation and all other comparable applications.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a regulating system, the combination of a light source, a quantity measuring instrument having means associated therewith for reflecting a beam of light from said source, a photo-electric cell disposed to be in the path of said light beam when an indicating element of said instrument is in a predetermined position range, means for permitting said reflected light to fall upon said cell only during definitely recurring time periods the length of which varies from a minimum, when the instrument element is at one extreme in said position range, progressively to a maximum, when the instrument element is at the other extreme in the range, quantity-adjusting equipment, and means controlled by said photo-electric cell for energizing said equipment.

2. A regulating system comprising, in combination, a quantity-measuring instrument disposed to control the position of a light beam reflected from a mirror carried by a movable element of the instrument, a photo-electric cell disposed to be in the path of the light beam when said instrument element moves in one direction away from a given position corresponding to a pre-determined value of a quantity regulated, and a second cell similarly disposed to be in the path of the beam when the element moves in the other direction from the given position, means disposed between the mirror and said cells for permitting the light beam to reach the cells only during regularly spaced time periods, the duration of which varies in accordance with the magnitude of deviation of the instrument element from the said given position, quantity-adjusting means, and relay means influenced by said photo-electric cells for controlling said quantity-adjusting means.

3. A regulating system comprising a measuring instrument influenced by a quantity to be regulated, said instrument having a movable element, a mirror carried by said element, a source of illumination for directing upon said mirror a light beam which is reflected therefrom, a photo-electric cell disposed to be in the path of said reflected beam when said instrument element moves away from a predetermined position, light-screening means disposed between the mirror and the cell for permitting the light beam to fall upon the cell only during regularly spaced time periods, said means comprising a disc having an opening therein through which the light beam may pass, and means for rotating said disc, the said opening being aligned with the path of the reflected beam once during each rotation of the disc, and quantity-adjusting means controlled in accordance with the illumination of said photo-electric cell.

4. Regulating apparatus comprising a measuring instrument influenced by a quantity to be regulated, said instrument having a movable element, a mirror carried by said element, a source of illumination for directing upon said mirror a light beam which is reflected therefrom, a photo-electric cell positioned to lie in the path of said reflected beam when said instrument element is in a predetermined position range, light-screening means disposed between the mirror and the cell comprising a disc having an opening therein, means for rotating said disc, said disc being so positionally disposed that the opening therein passes in line with the path of the light beam once for each rotation and thus permits the beam to fall upon the cell during recurring time periods spaced in accordance with the rotative speed, the shape of the said disc opening being such that the duration of said time periods varies in accordance with the portion of the aforementioned position range which the said instrument element occupies, and quantiy-adjusting means controlled in accordance with the illumination of said photo-electric cell 5. A regulator comprising, in combination, quantity-adjusting means and operating circuits therefor energized in accordance with the light excitation of a photo-electric cell, a measuring instrument influenced by a quantity regulated, means operable by an indicating element of said instrument for directing a beam of light upon the photo-electric cell when said element moves away from a predetermined position, and light-screening means, comprising a disc element having an opening therein and rotating means associated therewith, disposed to permit the light beam to fall upon and excite the photo-electric cell only during the portion of each rotation that the disc element opening is in line with the path of light, the shape of said opening being such that the duration of said cell light-excitation periods varies in accordance with the distance that the instrument element is away from the aforementioned predetermined position.

6. Regulating apparatus comprising a measuring instrument having means disposed to direct a beam of light upon the one or the other of two photo-sensitive devices when the magnitude of a measured quantity deviates from a given value, a circular disc screening element disposed between the instrument and the photo devices in such manner that the light beam, in being shifted in response to changes in the measured quantity, strikes the disc at radii of progressively different values, said disc having openings therein on each side of an intermediate radius corresponding to an instrument-indication of the aforementioned given quantity value, which openings are so shaped that the angular distance included by them increases with the distance of the radii included thereby from the said intermediate radius, means for rotating said disc and means controlled by said photo-sensitive device for adjusting the magnitude of the measured quantity.

7. In a regulating system, the combination of a measuring instrument, influenced by a quantity to be regulated, having a movable element which carries a mirror, a reflector element disposed to direct a light beam from each of two separate light sources upon said mirror in such manner that the two beams are reflected from the mirror in different directions, a photo-electric cell disposed to lie in the path of one of said reflected beams when the instrument element is on one side of a predetermined normal position, and a second photo-electric cell disposed to lie in the path of the other reflected beam when the instrument element is on the other side of the same position, screening means comprising a disc element having an opening therein, and rotating means associated therewith, disposed to permit each light beam to fall upon and excite the associated photo-electric cell only during the portion of each disc rotation that the opening is in line with the path of the respective beam, the shape of said opening being such that the duration of said cell light-excitation periods varies in accordance with the distance that the instrument element is away from the aforementioned normal position, and quantity-adjusting means controlled in accordance with the excitation of said photo-electric cells.

8. Regulating apparauts comprising an instrument having a movable element which carries a mirror disposed to reflect the one or the other of two beams of light, which are directed thereon from two separate light sources, respectively upon the one or the other of two photo-sensitive devices when the magnitude of a measured quantity deviates from a given value, a circular-disc screening element disposed between the instrument and the photo-devices in such manner that the two light beams, in being shifted in response to changes in the measured quantity, strike the disc at points of progressively and oppositely changing radii values, said disc having an opening therein on one side of a neutral radius at which both light beams strike the disc when the instrument indicates the aforementioned given quantity value, said opening being so shaped that the angular distance included by it increases with the distance of the radii included whereby from the said neutral radius, means for rotating said disc and means controlled by said photo-sensitive devices for adjusting the magnitude of said measured quantity.

9. In a regulating system, the combination of an instrument having a movable element which carries a mirror, means for influencing said instrument by a quantity to be regulated, a source of light, a reflector element disposed to direct a beam of light from said source upon said mirror from which it is reflected in a direction, dependent upon the position of said instrument element, a photo-sensitive device positioned to lie in the path of said reflected beam, means controlled by said photo-device for adjusting the magnitude of the regulated quantity, light-screening means intermediate the mirror and the photo-device, and means for compensating the action of said regulating system comprising means for shifting the position of said reflector element to thus change the direction of the light beam which is directed upon the instrument mirror from the light source.

10. In a regulating system in combination, a source of light, a measuring instrument influenced by a quantity to be regulated, said instrument having an indicating element and optical means associated therewith for reflecting a beam of light from said light source, a photo-electric cell positioned to lie in the path of said beam when said instrument element is within a predetermined portion of its indicating range, screening means positioned intermediate the photo-cell and the optical means, said screening means having an opening therein, means for aligning said opening with the light beam at regular time intervals to allow passage of the beam therethrough, said opening being so shaped that the duration of the resulting recurring time periods of photo-cell illumination varies in accordance with the position of said instrument element in the aforementioned indicating range, quantity-adjusting equipment, means controlled by said photo-cell for energizing said equipment, and means for changing the size of the opening in said screening means to change the relative lengths of duration of said cell-illumination periods.

11. Regulating apparatus comprising a measuring instrument having a movable element, a mirror carried by said element, two positionally-separated light sources each of which is disposed to direct a beam of light upon said mirror which acts to reflect said beams in different directions, two photo-sensitive devices each of which is positioned to selectively lie in the path taken by one of said two reflected beams when the magnitude of a measured quantity respectively deviates above and below a given value, a circular-disc screening element disposed between the instrument and the photo-devices in such manner that the two light beams, in being shifted in response to changes in the measured quantity, strike the disc at points of progressively and oppositely changing radii values, said disc having an opening therein on one side of a neutral radius at which both light beams strike the disc when the instrument indicates the aforementioned given quantity value, means for changing the position of said two light sources to thereby adjust the magnitude of said neutral radius, means for rotating said disc, and means controlled by said photo-sensitive devices for adjusting the magnitude of said measured quantity.

12. Regulating apparatus comprising a measuring instrument having a movable element, a mirror carried by said element, two positionally-separated light sources each of which is disposed to direct a beam of light upon said mirror which acts to reflect said beams in different directions, two photo-sensitive devices each of which is positioned to selectively lie in the path taken by one of said two reflected beams when the magnitude of a measured quantity respectively deviates above and below a given value, a circular-disc screening element disposed between the instrument and the photo-devices in such manner that the two light beams, in being shifted in response to changes in the measured quantity, strike the disc at points of progressively and oppositely changing radii values, said disc having an opening therein on one side of a neutral radius at which both light beams strike the disc when the instrument indicates the aforementioned given quantity value, said opening being so shaped that the angular distance included by it increases with the distance of the radii included thereby from the said neutral radius, means for changing the dimensions of said opening, and means controlled by said photo-sensitive devices for adjusting the magnitude of said measured quantity.

13. In a regulating system, the combination of an instrument having a movable element which carries a mirror, means for influencing said instrument by a quantity to be regulated, a source of light, a reflector element disposed to direct a beam of light from said source upon said mirror from which it is reflected, a photo-sensitive device located in the path of said reflected beam, means controlled by said device for adjusting the magnitude of the regulated quantity, light-screening means intermediate the instrument mirror and the photo-device, and means for compensating the action of said regulating system in accordance with variations in a second quantity related to the regulated quantity comprising means for automatically adjusting the position of said reflector element in accordance with variations in said second quantity.

RALPH A. GEISELMAN.